May 29, 1962 H. NEUMANN ETAL 3,037,092

STORING TELEVISION SIGNALS

Filed Aug. 4, 1959

Inventors.
Helmut Neumann, &
Peter Drost.
By [signature] Atty.

United States Patent Office 3,037,092
Patented May 29, 1962

3,037,092

STORING TELEVISION SIGNALS

Helmut Neumann and Peter Drost, Karlsruhe, Germany, assignors to Siemens & Halske Aktiengesellschaft Berlin and Munich, a corporation of Germany Filed Aug. 4, 1959, Ser. No. 831,534
Claims priority, application Germany Oct. 20, 1958
6 Claims. (Cl. 179—100.2)

This invention is concerned with a method of and apparatus for magnetically storing and utilizing television signals.

Television signals generally require a wide frequency band, for example, from 0 to 4.5 megacycles; considerable difficulties must therefore be overcome in connection with the magnetic recording and reproduction of such signals. The high upper limit frequency requires a very high relative speed between magnetic head and signal carrier, for example, a magnetic tape, since the shortest signal half wave recorded upon the tape must exceed the gap width of the magnetic head. This results, with gap widths on the order of magnitude of a few microns, which are practically reasonably controllable, in speeds between 5 meters and 50 meters per second.

It is known to use a tape upon which are produced recording tracks extending transverse to its motion and to scan the tape by means of magnetic heads disposed peripherally of a rotating disk. The speed of the tape can thereby be reduced to 38 centimeters per second despite the fact that the relative speed between the magnetic head and the tape amounts to approximately 40 meters per second. At such high relative speed between magnetic head and the tape, frequencies on the order of magnitude of 4 megacycles can be recorded and reproduced by using known ring-magnet magnetic heads; however, the frequencies on the order of magnitude of a few cycles, which are in connection with the transmission of television signals very important, are recorded on the tape with very long wave lengths. They accordingly produce in an inductive reproduce or pickup head, for example, a ring head, only an extremely low voltage which lies below the noise level and therefore is practically unsuitable for reproduction.

In order to overcome this difficulty, it is known to employ modulation so as to shift the low frequencies of the television signal into a higher frequency range. This is in known arrangements effected by frequency modulation of the entire television signal or by subdividing the television signal into several frequency ranges which are individually frequency modulated and recorded on individual tracks. The signal is upon reproduction demodulated and if necessary, the partial signals are again mixed with different frequency ranges.

The modulation of the television signal results in various disadvantages and difficulties. For example, a deleterious effect on the signal is unavoidable in view of the requirement that the upper limit frequency should not be increased. A known method, for example, provides for the television signal a carrier frequency of 5 megacycles, with a band width of 1 megacycle and a highest modulation frequency of 4.5 megacycles. The modulation frequency accordingly approaches approximately the carrier frequency. However, upon reducing the spacing between the modulation frequency and the carrier frequency, there will increasingly appear disturbing combination frequencies.

The problem to be solved by the invention is to avoid modulation of the television signal for purposes of reproduction of the lower frequencies.

The invention proposes, for the solution of this problem, to record the unmodulated video signal by one or more ring heads provided with a winding, and to use for the scanning one or more scanning heads utilizing the Hall effect. It is thereby of advantage to provide respectively for a recording head and a scanning head a common gap for engagement with the tape.

Magnetic heads utilizing the Hall effect have been proposed before. In such magnetic heads, there is provided a substance exhibiting the Hall effect, in the form of a coating, thin layers, etc., between two pieces of ferromagnetic material, such that magnetic lines of force derived from the tape at a gap permeate through the plane thereof.

The generally rectangularly shaped surface of the so-called Hall generator has at its narrow sides terminals for supplying an auxiliary current and at its long sides terminals for taking off the reproduction voltage corresponding to the scanned recording. The current given off by a scanning head utilizing the Hall effect is proportional to the momentary value of the field strength of the recording on the tape and is therefore independent of the relative speed between the tape and the magnetic head. However, in an inductive scanning head, the current of the field strength alteration is proportional and therefore drops with increasing wave length of the recorded signal.

In accordance with a further feature of the invention, and assuming recording along tracks extending transverse to the direction of motion of the tape, to reduce the tape speed, as is in most cases desired, the auxiliary current which is required for the reproduce or pickup heads utilizing the Hall effect, can be produced by means of a rotating part of the apparatus.

Further objects, features and details of the invention will appear from the description of embodiments which will be rendered below with reference to the accompanying drawing. In the drawing, FIG. 1 shows a rotatable head carrier;

As is known, a tape-like carrier is in most cases (picture film, sound reproduction) used as a record carrier for prolonged recordings. As mentioned before, a reduction of the tape speed can in the case of television recording be effected either by recording the signal on tracks extending transverse to the direction of motion of the tape or by subdivision of the signal into individual frequency or amplitude ranges which enables recording of the signal along a plurality of tracks extending in parallel to the tape motion. It is moreover feasible to combine these features. The invention is applicable in all these cases.

The production of recording tracks extending transversely of the direction of motion of the tape shall now be assumed to give an example of the invention.

Figure 1:
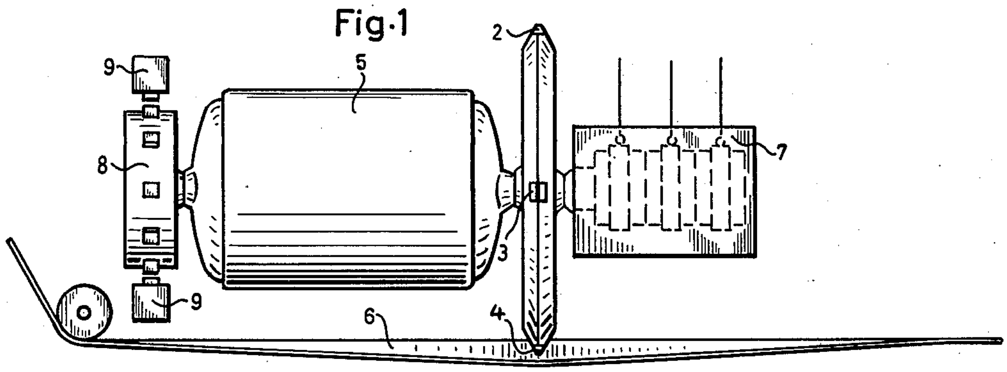

In FIG. 1, numeral 1 indicates a rotating disk carrying peripherally thereof magnetic heads such as indicated at 2, 3, 4. The structure of these magnetic heads will be presently described. The disk 1 is by a motor 5 rotated at high speed of revolution corresponding to the relative speed between the tape and the magnetic heads. Numeral 6 indicates a tape which embraces the disk 1 carrying, for example, four magnetic heads peripherally thereof, to such extent that it is always swept by at least one magnetic head. Numeral 7 indicates an arrangement of slip ring contacts for establishing connection between the magnetic heads and if desired, for connecting the individual heads each with an amplifier (not illustrated) provided therefor. Each amplifier may be in known manner provided with an electronic switch so as to effect connection of the respective head thereto only for predetermined times, for example, corresponding to a whole number of lines of the television picture.

The magnetic heads employed for the reproduction and, according to the invention, utilizing the Hall effect, require an auxiliary current. According to the invention, this auxiliary current can be generated by the rotating part of the apparatus. An auxiliary armature 8 is for this purpose provided on the shaft of the motor 5, in which is during the running of the motor induced a current by field magnets 9. This current can be rectified within the rotating part and used as auxiliary current, thereby making additional slip rings unnecessary.

So far as the principles underlying the invention are concerned, different magnetic heads may be employed for the recording and reproduction. However, since the magnetic heads must be accurately adjusted, it is advantageous to provide for the recording head and the reproduce or pickup head a common gap engaging the tape. Corresponding combined record and pickup heads are illustrated in FIGS. 2 and 3.

Figure 2:
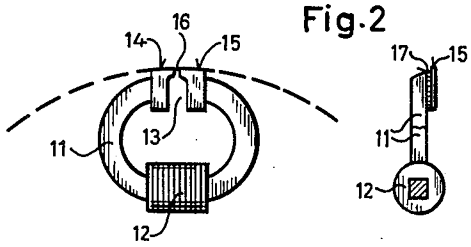
FIGS. 2 and 3 show record and reproduce or pickup heads.

In FIG. 2, numeral 11 indicates a ring-shaped core made of ferromagnetic material, for example, ferrite. This core is provided with a winding 12 to which is conducted the signal to be recorded. The ring core 11 is interrupted at 13 and provided with pole pieces 14, 15. The pole pieces 14, 15 may consist of leaves of very hard ferromagnetic material with great resistance against abrasion. The gap 16 is in usual manner filled with a suitable preferably diamagnetic material. For the reproduction, there is provided a member 17 exhibiting the Hall effect, which may be a foil or leaf-like member, or formed as a coating by vaporization or etching-off, such member being disposed between the core and one of the pole pieces 14, 15 so that it will be permeated by the magnetic lines of force. If required, such a Hall generator may be provided in back of each pole piece 14, 15. The Hall generators may be connected serially or in parallel relationship.

Figure 3:
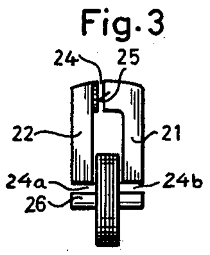

FIG. 3 illustrates another embodiment of a combined recording and reproduce head for practicing the method according to the invention. This head is likewise provided with a ferrite core comprising the parts 21, 22 and 26, the winding 23 being disposed upon the part 26. The Hall generator 25 is in this embodiment disposed within the gap 24. Owing to the rearward gaps 24*a* and 24*b* of the magnetic head, the magnetic flux from the tape will substantially extend through the gap 24 and therewith through the Hall generator 25. The disposal of the Hall generator within the gap of the magnetic head is possible because the layer exhibiting the Hall effect may be very thin, for example, on the order of magnitude of 1 micron.

Figure 4:
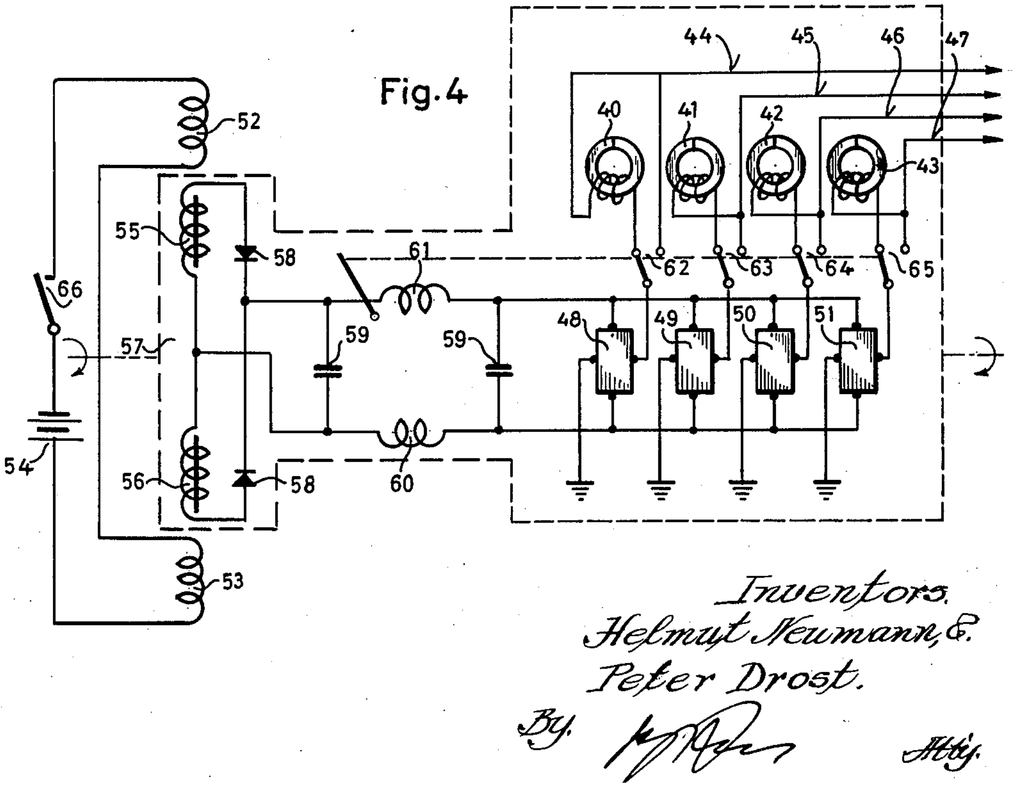
FIG. 4 shows a circuit for the magnetic heads arranged on the rotatable head carrier.

The use of rotating magnetic heads introduces the problem of providing reliable electrical connections extending to the rotating part of the apparatus. FIG. 4 shows an example of a solution for this problem.

In FIG. 4, there are provided four magnetic heads 40–43, each head equipped with a recording winding. The lines 44–47 extend respectively each by way of a slip ring to the amplifier cooperatively associated with the corresponding heads. Numerals 48–51 indicate the Hall generators required for the scanning, such Hall generators being respectively included in the magnetic circuits of the corresponding ring heads. For the production of the auxiliary current for the Hall generators, there are provided stationary field electromagnets 52, 53 (corresponding to field magnets 9 shown in FIG. 1), which are supplied with current from a direct current source 54 by way of a switch 66. The magnetic fields of these magnets permeate the armature windings 55, 56 carried by the rotor 57, such rotor being diagrammatically illustrated by dotted lines, which, for example, may be disposed upon a common shaft supporting the rotating head carrier. Provided on the rotor 57 are rectifiers 58, smoothing capacitors 59 and, if desired, inductances 60, 61 which also serve the purpose of smoothing the direct current. The inductance 61 may also form the actuating winding of a relay, the armature of which controls the switch-over contacts 62–65.

In the illustrated embodiment, the contacts 62–65 are positioned so as to connect the respective recording windings in series with the corresponding Hall generators. For the reproduction of the recording, the switch 66 will be actuated to close a circuit for the energization of the magnets 52, 53 (magnets 9 in FIG. 1). The direct current now flowing in the circuit causes the relay 61 to energize. Contacts 62–65 controlled by the relay 61 are now actuated into alternate positions, thereby effecting disconnection of the recording windings of the magnetic heads 40–43 while connecting the Hall generators to the respective output lines 44–47.

In order to avoid, incident to the signal scanning, voltage level fluctuations due to inhomogeneities of the magnetic tape, a regulation voltage may be derived from a recorded auxiliary signal, for example, synchronization pulses, for effecting amplification regulation for the scanned signal, thereby obtaining in the scanning a constant signal level independent of fluctuating properties of the tape. In prior arrangements, a constant signal level was obtained by limiting the frequency modulated signal ahead of the demodulator.

Changes may be made within the scope and spirit of the appended claims which define what is believed to be new and desired to have protected by Letters Patent.

We claim:

1. Apparatus for mechanically storing and utilizing television signals, comprising a rotating member carrying a plurality of ring heads, each provided with a winding for recording unmodulated video signals upon a tape along tracks extending transversely of the direction of motion of said tape, said heads each having means exhibiting the Hall effect for scanning the recorded signals for the reproduction, said ring heads operating as recording heads in accordance with the principle of induction while operating as reproduce heads utilizing the Hall effect with their operative gaps in engagement with said tape, and a device for rotating said member, said device comprising means for rectifying an exteriorly induced alternating voltage to form an auxiliary voltage for the operation of said heads as scanning heads.

2. Apparatus for mechanically storing and utilizing television signals, comprising a rotating member carrying a plurality of ring heads, each provided with a winding for recording unmodulated video signals upon a tape along tracks extending transversely of the direction of motion of said tape, said heads each having means exhibiting the Hall effect for scanning the recorded signals for the reproduction, said ring heads operating as recording heads in accordance with the principle of induction while operating as reproduce heads utilizing the Hall effect with their operative gaps in engagement with said tape, each of said heads comprising a winding and a ring-shaped core made of ferrite, at least one Hall generator being disposed within the gap between parts of said core.

3. Apparatus according to claim 2, wherein each head is provided with pole pieces, disposed within the core gap, for engagement with said tape, said pole pieces made from material different than that of the corresponding core, and a Hall generator disposed between a pole piece and the core.

4. Apparatus according to claim 2, comprising means for electrically connecting the respective windings of said heads with one or more of said Hall generators.

5. Apparatus according to claim 1, comprising means for switching said heads from operation as recording heads to operation as scanning heads, and means for automatically actuating said switching means responsive to operative connection of said auxiliary current.

6. Apparatus according to claim 5, comprising a relay disposed in the circuit of said auxiliary current, said relay controlling the operation of said switching means.

(References on following page)

References Cited in the file of this patent

UNITED STATES PATENTS 2,711,945 Kornei ---------------- June 28, 1955
2,813,924 Coutant --------------- Nov. 15, 1957
2,866,013 Reis ------------------ Dec. 23, 1958

2,900,451 Havstad --------------- Aug. 18, 1959
2,916,639 Krembs ---------------- Dec. 8, 1959
2,921,990 Ginsburg et al. ------- Jan. 1, 1960

FOREIGN PATENTS 38,725 Germany --------------- Sept. 6, 1956